Figure 1:
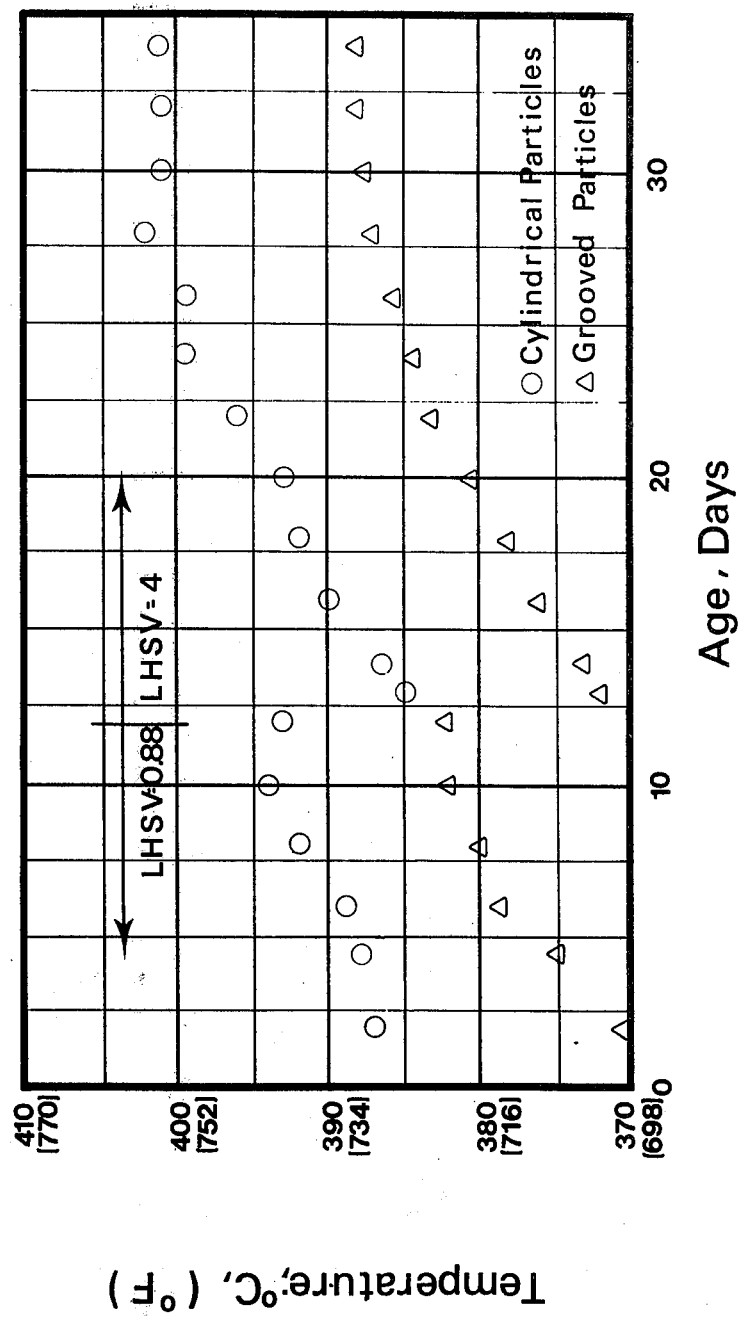

United States Patent [19]
Frayer et al.

[11] 4,116,819
[45] Sep. 26, 1978

[54] HYDRODESULFURIZATION PROCESS INCLUDING PRODUCT RECYCLE

[75] Inventors: James Albert Frayer, Pittsburgh; Henri K. Lese, Monroeville; Joel Drexler McKinney, Pittsburgh; Kirk J. Metzger, Pittsburgh; John Angelo Paraskos, Pittsburgh, all of Pa.

[73] Assignee: Gulf Research & Development Company, Pittsburgh, Pa.

[21] Appl. No.: 810,860

[22] Filed: Jun. 28, 1977

[51] Int. Cl.² .................................. C10G 23/02
[52] U.S. Cl. .................................. 208/216
[58] Field of Search ............ 208/216 R, 216 PP, 212; 252/465

[56] References Cited
U.S. PATENT DOCUMENTS

| Re. 29,315 | 7/1977 | Carlson et al. | 208/216 |
|---|---|---|---|
| 3,331,769 | 7/1967 | Gatsis | 208/216 R |
| 3,674,680 | 7/1972 | Hoekstra et al. | 208/216 R |
| 3,990,964 | 11/1976 | Gustafson | 208/216 PP |
| 3,997,431 | 12/1976 | Beuther et al. | 208/216 R |
| 4,028,227 | 6/1977 | Gustafson | 208/216 PP |

*Primary Examiner*—George Crasanakis

[57] ABSTRACT

A catalytic asphaltene-containing oil hydrodesulfurization process employing a fixed catalyst bed comprising particles of supported Group VI and Group VIII metals, preferably together with a separate and downstream fixed catalyst bed comprising particles of Group VI and Group VIII metals together with a promoting amount of Group IV-B metal. The catalyst particles in both beds are in the form of elongated extrudates whose surface is provided with a plurality of alternating longitudinal grooves and protrusions. An advantageous mass velocity-related catalyst activity effect is achieved by recycling a portion of the desulfurized liquid product.

21 Claims, 4 Drawing Figures

Relationship Between Mass Velocity and Catalyst Particle Shape

Effect of Catalyst Particle Shape in Second Stage Hydrodesulfurization

HYDRODESULFURIZATION PROCESS INCLUDING PRODUCT RECYCLE

This invention relates to a process for the hydrodesulfurization of metal- and sulfur-containing asphaltenic residual oils in a reactor employing recycle of product liquid.

The hydrodesulfurization reactor can contain a single bed comprising non-promoted catalyst as described below, but preferably contains a bed of non-promoted catalyst and a separate bed of promoted catalyst, as described below, with the bed of non-promoted catalyst being disposed in an upstream zone and the bed of promoted catalyst being employed in a downstream zone of the reactor. The particles of both the non-promoted and the promoted catalyst have a surface provided with at least one groove and at least one protrusion. Preferably, the catalyst particles are elongated extrudates whose surface is provided with a plurality of alternating longitudinal grooves and protrusions, as described below. It is shown below that the non-promoted catalyst is particularly effective for desulfurizing fresh feed oil and that the promoted catalyst is particularly effective for removal of refractory sulfur from a desulfurized oil. Therefore, use of the promoted catalyst is especially advantageous in a reactor employing recycle of desulfurized liquid product. In a reactor employing a recycle stream, with the non-promoted catalyst disposed as an upstream catalyst layer and the promoted catalyst disposed as a contiguous downstream catalyst layer, the fresh feed oil is advantageously desulfurized by the upstream layer of non-promoted catalyst while the recycle oil is advantageously desulfurized by the downstream layer of promoted catalyst.

The composition of the promoted catalyst of this invention is disclosed in U.S. Pat. No. 3,968,027 to Frayer et al., which is incorporated by reference. This patent, and U.S. Pat. No. 3,968,029 to Frayer et al., both disclose many advantages relating to the use of the promoted catalyst. However, these patents do not disclose the use of a promoted catalyst whose surface is provided with the multi-grooved shape described below. We have now discovered that when the promoted catalyst is used in the form of shaped particles, surprisingly advantageous results are achieved. While a number of patents disclose the use of hydrodesulfurization catalyst particles having a multi-grooved shape, including U.S. Pat. Nos. 3,674,680; 3,764,565; 3,857,780; 3,990,964 and 3,966,644; none of these patents discloses the adaptation of this particle shape to the promoted catalyst as described herein. It is shown below that the adaptation of the multi-grooved particle configuration to the promoted catalyst composition provided the early development of a plateau-like catalyst aging curve which was not achieved by the adaptation of the multi-grooved shape to a non-promoted catalyst. It is also shown below that the activity of the multi-grooved promoted catalyst and also of the multi-grooved non-promoted catalyst is improved by increasing the oil mass velocity over the catalyst.

The non-promoted catalyst is a supported Group VI and Group VIII metal hydrodesulfurization catalyst. Suitable Group VI and Group VIII metal combinations include cobalt-molybdenum, nickel-tungsten and nickel-molybdenum. A preferred combination is nickel-cobalt-molybdenum. The catalyst can comprise 5 to 30 weight percent, generally, and 8 to 20 weight percent, preferably, of Group VI and Group VIII metals. The catalyst composition includes a highly porous, non-cracking supporting material. Alumina is the preferred supporting material but other porous, non-cracking supports can be employed, such as silica-alumina and silica-magnesia.

The promoted catalyst can be generally described by the definition of the non-promoted catalyst, except that it is promoted with from 1 to 10 weight percent, generally, and from 2.5 to 8 weight percent, preferably, of a Group IV-B metal, such as titanium, zirconium or hafnium, preferably titanium. The non-promoted catalyst generally differs from the promoted catalyst in that the non-promoted catalyst does not contain a promoting amount of Group IV-B metal. In the promoted catalyst, the Group IV-B metal and the Group VI and VIII metals can be impregnated on the surface of the support in the manner disclosed in U.S. Pat. No. 3,840,473, which is hereby incorporated by reference, as contrasted to being incorporated within the supporting material. A solution of titanium tetrachloride in n-heptane can typically be employed for the impregnation. Use of more than 8 to 10 weight percent of Group IV-B metal can be deleterious to hydrodesulfurization activity, as well as being economically wasteful. A molecular monolayer coverage of titanium oxide on commonly employed hydrodesulfurization catalyst supports would deposit about 5 to 8 weight percent of titanium on the catalyst. Use of more than a monolayer would be wasteful and could tend to block catalyst pores and prevent access of large oil molecules to the catalyst interior. On the other hand, less than 1 weight percent of titanium will not promote the activity of the catalyst.

The shaped catalyst particles, including particles of both non-promoted and promoted catalyst, are solid and have a surface provided with at least one groove and at least one protrusion. Preferably, the particles are elongated extrudates having multiple alternating elongated straight or curved surface grooves or indentations and protrusions. The number of grooves can be between 1 or 2 and 8, although 3 or 4 are preferred. The grooves form alternating longitudinal projections, which can be rounded, extending along the length of the catalyst particle so that a view of a cross-section taken through the axis of a particle shows a plurality of surface projections which are joined by intersecting to form a unitary catalyst structure, providing particle strength in the intersecting region.

The "diameter" of the grooved catalyst particles can be expressed as twice the shortest surface-to-central axis dimension. The measurement is made from the depth of the crevice which constitutes the deepest surface penetration between protrusions to the central axis of the particle. The "diameter" dimension as defined herein for the shaped catalyst particles of this invention is generally between about 1/15 and 1/60 inch (0.17 and 0.042 cm), preferably between about 1/20 and 1/55 inch (0.127 and 0.046 cm), and most preferably between about 1/25 and 1/50 inch (0.102 and 0.051 cm). The size of most or nearly all of the particles employed will be within this range. The corresponding "radius" dimensions will be one-half of these values, or generally between about 1/30 and 1/20 inch (0.085 and 0.021 cm), preferably between about 1/40 and 1/110 inch (0.064 and 0.023 cm), and most preferably between about 1/50 and 1/100 inch (0.051 and 0.025 cm).

It was surprisingly found that when a hydrodesulfurization catalyst with four projections formed by four grooves and having a 1/36 inch (0.07 cm) diameter dimension as defined herein was crushed to destroy the shape configuration of the original particles, thus forming smaller, granular particles 20 to 35 mesh (0.0165 to 0.0331 inch) (0.0419 to 0.0841 cm) in size, catalyst activity was not increased even though the surface area to volume ratio was increased by said crushing. On the other hand, it was found that crushing of a catalyst of similar composition in the form of cylindrical particles having a conventional diameter of 1/32 inch (0.08 cm) to the same mesh size did increase its activity. It is generally expected that any size reduction will increase catalyst activity because of a concomitant increase in particle surface area to volume ratio. Therefore, the absence of an activity increase due to particle size reduction for the shaped particles indicates that shaped particles within the size range of this invention surprisingly already possess an optimum activity due to particle shape. Since crushing did not increase catalyst activity, it would not be advantageous to employ particles of a smaller size than defined herein because such a smaller size would only tend to increase the pressure drop in the system without a concomitant activity advantage.

Possible reasons for the optimum activity due to particle size of the shaped catalyst of this invention is that the shape of the particle may induce a viscosity- or surface tension-related enhanced liquid hold-up or residence time or enhanced particle liquid wetting capacity in a reactor employing downward or trickle flow, as compared to the liquid residence time or liquid wetting capacity with non-grooved particles. The shaped catalyst of this invention provides multiple points of contact between adjacent particles, thereby minimizing close packing, increasing reactor void volume and increasing the particle zones which can be wetted. It would have been expected that the use of particles which increase reactor void volume would reduce catalytic activity because of the resulting lower volume of catalyst particles in a given volume of reactor space. However, the above-mentioned test comparing the activity of crushed and uncrushed shaped particles of this invention unexpectedly showed that shaped catalyst particles within the size range of this invention do not suffer an activity disadvantage due to a reduced volume of catalyst.

As indicated above, we have found that a shaped catalyst as described herein performs in an unexpectedly advantageous manner at high liquid mass velocities. In a residual oil hydrodesulfurization test, shaped catalyst particles having four grooves and a 1/36 inch (0.07 cm) diameter dimension as defined above provided a 21.6° F. (12° C.) temperature advantage relative to cylindrical particles having a conventional diameter of 1/32 inch (0.08 cm) at a 0.88 liquid hourly space velocity, whereas at a liquid hourly space velocity of 4 the temperature advantage increased to 24.3° F. (13.5° C.), all other process conditions remaining unchanged.

Mass velocity is defined as the weight of liquid flow per unit area of reactor cross-section per unit time. Therefore, in any reactor employing the shaped catalyst the observed advantage arising from an increased mass velocity can be obtained by recycling liquid product. Any amount of 50 percent of the liquid product can be recycled. Recycle of liquid product advantageously reduces the viscosity of the oil in the reactor. The full-range liquid product can be recycled, or the liquid product can be fractionated and either a gas oil fraction or a residual fraction can be recycled. Recycle of a gas oil fraction will enhance the viscosity reduction effect of recycle.

The shaped catalyst particles of this invention can be further defined as concave particles, as contrasted to convex particles. A geometric solid is defined as convex if all pairs of points lying within or on the surface of the solid can be connected by a straight line which is completely contained within the surface. Spherical and cylindrical particles are convex. Conversely, a geometric solid is concave if at least one pair of points lying within or on the surface of the solid can be connected by a straight line which is not completely contained within or on the surface of the solid. The geometric volume of the smallest convex solid containing a concave solid will be greater than the geometric volume of the concave solid. Letting $V_x$ equal the volume of the minimum convex solid which can contain a specified concave solid and $V_c$ equal the volume of the contained concave solid, a resulting concavity index factor C can be defined as:

$$C = V_x/V_c$$

A concave geometric solid has a concavity index greater than one. The average concavity index of the shaped catalyst particles of this invention is generally between about 1.01 and 1.35, preferably is between about 1.03 and 1.05 and 1.25, and most preferably is between about 1.10 and 1.20.

The external surface area to volume ratio of the shaped catalyst particles of this invention is generally between about 80 and 200 l/inches (31.1 and 78.7 l/cm), and preferably is between about 100 and 180 l/inches (89.4 and 70.8 l/cm). The internal surface area of the shaped catalyst of this invention can be between about 100 and 350 square meters per gram.

The shaped catalyst particles of this invention will have a total pore volume in the range of about 0.3 to 0.85 cubic centimeters per gram, according to the BET method of measurement, with more than half of the pore volume being in pores having a radius between 50 and 300 A.

As discussed above, the shaped catalyst particles of this invention will provide a higher reactor void volume than cylindrically shaped particles. If $V_p$ equals the volume of each particle, including pore volume, times the number of particles, and $V_v$ equals the volume of the total reactor void space, excluding pore volume, then the void fraction is:

$$\frac{V_v}{V_v + V_p}$$

The void fraction in a reactor employing shaped catalyst particles of this invention is between about 0.20 and 0.95, generally, and preferably is between about 0.25 and 0.55.

The hydrodesulfurization process of this invention employs a hydrogen partial pressure of 1,000 to 5,000 psi (70 to 350 kg/cm$^2$), generally, 1,000 to 3,000 psi (70 to 210 kg/cm$^2$), preferably, and 1,500 to 2,500 psi (105 to 175 kg/cm$^2$), most preferably. The gas circulation rate can be between 1,000 and 20,000 SCF/B (17.8 and 356 SCM/100L), generally, or preferably about 2,000 to 10,000 SCF/B (35.6 to 178 SCM/100L). The gas circulated preferably contains 85 percent or more of hydrogen. The mol ratio of hydrogen to oil can be between about 4:1 and 80:1. Reactor temperatures can vary between about 600 and 900° F. (316° and 482° C.), generally, and between 650° and 800° F. (343° and 427° C.), preferably. Reactor temperatures are increased during a catalyst cycle to compensate for catalyst aging loss. The temperature should be sufficiently low so that not more than 30 percent, generally, and preferably not more than about 10, 15 or 20 weight percent of the 650° F.+ (343° C.+) feed oil will be cracked to material boiling below 650° F. (343° C.). Most of the product oil boils above the initial boiling point of the feed oil, generally, and preferably at least 70, 80 or 90 weight percent of the total product boils above the initial boiling point of the feed oil. The liquid hourly space velocity in each reactor can be between about 0.1 and 10, generally, and between about 0.2 and 1.25, preferably, volumes of oil per hour per volume of catalyst.

The feed oil to the process of this invention can be a full petroleum crude or an atmospheric or vacuum tower reduced crude containing substantially all of the residual asphaltenes of the full crude. The process is also useful for desulfurizing other asphaltene-containing oils, such as coal liquids and oils extracted from shale and tar sands. Asphaltenes have a relatively low hydrogen to carbon ratio as compared to lower boiling oils and will generally contain most of the metallic components present in the total feed, such as nickel and vanadium. Since most desulfurization catalysts have a high activity for demetallization as well as for desulfurization, the non-promoted catalyst will remove a significant amount of the sulfur. These metals tend to deposit on the catalyst and to reduce the desulfurization activity of the catalyst. When separate layers of non-promoted and promoted catalyst are employed, removed nickel and vanadium will account for the ultimate deactivation of the non-promoted upstream catalyst, while coke deposition will contribute very little to deactivation of the upstream catalyst.

Since atmospheric or vacuum reduced crudes contain substantially the entire asphaltene fraction of the crude from which they are derived, they typically contain 95 to 99 weight percent or more of the nickel and vanadium content of the full crude. The nickel, vanadium and sulfur content of petroleum residual oils can vary over a wide range. For example, nickel and vanadium can comprise 0.002 to 0.03 weight percent (20 to 300 parts per million), or more, of the oil while sulfur can comprise about 2 to 7 weight percent, or more, of the oil. In the upstream or non-promoted catalyst bed, the nickel and vanadium gradually accumulate in the catalyst particle, ultimately causing the catalyst pores to become blocked. Upon blockage of the pores the aging rate of the catalyst ceases to be gradual and the catalyst aging rate increases abruptly to terminate the catalyst cycle.

The Group VI and Group VIII metals which are conventionally employed on hydrodesulfurization catalysts primarily impart desulfurization activity to the catalyst. Group IV-B promotor metals of the promoted catalyst of this invention improve the desulfurization activity of Group VI and Group VIII catalytic metals, but Group IV-B metals are relatively expensive to use and increase the cost of the catalyst. Although the promoted catalyst would provide increased desulfurization activity in an upstream hydrodesulfurization stage, it was shown in U.S. Pat. No. 3,968,027 that the improvement in desulfurization activity realized when the promoted catalyst is employed in an upstream hydrodesulfurization stage is much less than the improvement in the desulfurization activity realized when the promoted catalyst is employed in a downstream stage. Furthermore, it was also shown in U.S. Pat. No. 3,968,027 that the relatively smaller advantage of the promoted catalyst over the non-promoted catalyst in an upstream hydrodesulfurization stage declines with progressive catalyst age, while the relatively large desulfurization activity advantage of the promoted catalyst over the non-promoted catalyst in a downstream stage steadily increases with progressive catalyst age. It has now been discovered and is demonstrated below that the downstream stage aging advantage of the promoted over the non-promoted catalyst is enhanced considerably when the particles of the promoted catalyst are shaped in the manner described above.

A further disadvantage in the use of the promoted catalyst in an upstream bed is the metals deactivation limitation on the life of an upstream catalyst, so that the total weight of sulfur that can be removed with any upstream catalyst is limited by metals deposition on the catalyst. This factor tends to render it less economic to incur the additional cost of the promoted catalyst in an upstream stage.

In the preferred embodiment of this invention, a significant amount or most of the metals and sulfur are removed from the feed oil in the upstream catalyst bed and the oil then continues through the downstream bed for removal of the more refractory sulfur. While metals deposition is the primary cause for catalyst deactivation in the upstream bed, the primary cause for catalyst deactivation in the downstream bed is coking. Desulfurization severity is greater in the downstream bed than in the upstream bed, and it is known that catalyst coking increases with desulfurization severity. In prior art two-stage residual oil hydrodesulfurization processes, it was commonly expected that both the catalyst aging rate and coke formation on the catalyst would be considerably greater in the second stage than in the first stage. This high second stage coking phenomenon can probably be explained on a molecular basis. In the first stage, the existence of peripheral alkyl groups on feed asphaltene and resin molecules provides steric hindrance which tends to prevent contact of the polycondensed ring inner body of the residual molecules with the catalyst. However, the most refractory sulfur in the asphaltene molecules is not removed in the first stage and must be removed in a second stage. This sulfur is more refractory because it tends to be deeply imbedded within the aromatic nucleus. Following the elimination of some of the alkyl groups in the first stage, the molecules in the second stage are sterically better adapted to permit the aromatic nucleus to abut broadly against catalyst sites exposing the carbon atoms and ultimately and imbedded sulfur more intimately to the catalyst surface, thereby inducing coking. This mechanism probably accounts for the enhanced catalyst coking and higher aging rates in the second stage, as compared to the first stage.

It was shown in U.S. Pat. No. 3,968,027 that in a second desulfurization stage the promoted catalyst exhibits an improved desulfurization activity with a greatly inhibited coke make and improved catalyst aging characteristics. In addition to the improved second stage desulfurization activity and the improved second stage aging rate with the promoted catalyst, it was also shown in U.S. Pat. No. 3,968,027 that a given degree of desulfurization can be achieved with a substantially lower consumption of hydrogen with the promoted catalyst in the second stage, as compared to the use of a non-promoted catalyst in the second stage. This hydrogen savings accords with data showing that the promoted catalyst in the second stage is considerably more selective towards the desulfurization reaction than is the non-promoted catalyst so that the promoted catalyst induces considerably less side reactions, such as hydrogenolysis, aromatics saturation, metals removal, etc.

Since the promoted catalyst in the upstream zone is subject to a metals-limited catalyst life cycle, and since the desulfurization advantage for the promoted catalyst in upstream operation is relatively small and decreases with catalyst age, the promoted catalyst is not employed as an upstream catalyst of this invention. Instead, the less costly non-promoted catalyst is employed as the upstream catalyst. Since the downstream catalyst life cycle is coke-limited and since the particular advantage of the promoted catalyst is its high resistance against coking, the promoted catalyst is advantageously employed as a downstream catalyst. Thereby, the cheaper non-promoted catalyst is utilized in an early stage in which metals deactivation is controlling, while in more expensive promoted catalyst is utilized in a later stage in which coke deactivation is controlling, since the promoted catalyst is capable of inhibiting coking to a much greater extent than the non-promoted catalyst.

In the tests of the following examples, the promoted catalyst, regardless of shape, comprised alumina which was impregnated with molybdenum, nickel and titanium, and contained 3 weight percent nickel, 8 weight percent molybdenum and 5 weight percent titanium, impregnated on an alumina support. The non-promoted catalyst used in the following tests, regardless of shape, contained ½ weight percent nickel, one weight percent cobalt, 8 weight percent molybdenum, the remainder being alumina. All cylindrically shaped catalysts tested, regardless of composition, had a conventional surface-to-surface diameter through the axis of the particle of 1/32 inch (0.08 cm), and all shaped catalysts tested, regardless of composition, had four longitudinal alternating projections and grooves on the particle surface providing a concavity index of 1.15, and the dimension of twice the shortest surface-to-central axis distance was 1/36 inch (0.07 cm).

EXAMPLE 1

A test was conducted to illustrate the discovered mass velocity effect demonstrated by shaped catalyst particles. In this test, separate portions of a 650° F.+ (343° C.+) Kuwait ATB containing 3.8 weight percent sulfur were hydrodesulfurized at a hydrogen pressure of 1,950 psi (136.5 kg/cm²) employing a hydrogen rate of 7,400 SCF/B (133.2 SCM/100L). One portion of the feed oil was passed downwardly in trickle flow with hydrogen through one first stage reactor containing non-promoted catalyst particles of cylindrical shape as described above. The other portion of the feed oil was passed downwardly in trickle flow with hydrogen through another first stage reactor of the same size containing non-promoted shaped catalyst particles as described above.

At the start of the test the liquid hourly spaced velocity in each reactor was 0.88 volumes of liquid per hour per volume of catalyst. The temperature in each reactor was increased gradually with catalyst age so that a constant liquid product containing 0.95 weight percent of sulfur was recovered from each reactor. Reactant flow was continued through each reactor for about 12 days at the indicated space velocity whereupon the space velocity was increased to 4, so that the mass velocity also increased. At the higher space velocity the temperature in each reactor was similarly gradually increased with catalyst age so that a constant liquid product containing 2.4 weight percent of sulfur was recovered from each reactor.

FIG. 1 shows the temperature requirements in each reactor over the period of these tests. FIG. 1 shows that throughout the tests the temperature requirement in the reactor containing the shaped catalyst particles was lower than the temperature requirement in the reactor containing the cylindrical catalyst particles, indicating a relatively higher catalytic activity for the shaped catalyst particles. FIG. 1 contains the additional surprising showing that the temperature advantage in favor of the shaped catalyst was higher at the higher space velocity. For example, just prior to the increase in space velocity the temperature advantage in favor of the shaped catalyst was 21.6° F. (12° C.), while the average temperature advantage in favor of the shaped catalyst at the first three data points after the space velocity change was 24.3° F. (13.5° C.). Therefore, the temperature advantage for the shaped catalyst was found to increase significantly with an increase in mass velocity through the system, indicating that an advantageous effect can be achieved by recycling liquid product to a reactor utilizing the shaped catalyst particles of this invention.

EXAMPLE 2

Comparative tests were conducted to illustrate the discovered mass velocity effect demonstrated by the shaped catalyst particles in a second stage hydrodesulfurization operation utilizing a promoted catalyst. The feed oil in each test was the effluent obtained from a first hydrodesulfurization stage in which Kuwait ATB containing 3.8 weight percent sulfur was hydrodesulfurized to a 1.09 weight percent sulfur level. In these tests, individual portions of the first stage effluent together with 4,000 SCF of hydrogen per barrel (73 SCM/100L) were respectively passed downwardly in trickle flow over separate beds of cylindrical and shaped promoted catalysts, as described above, for a period of more than 50 days at 1 LHSV and at a pressure of 2,100 psi (147 kg/cm²), to accomplish about 71 percent desulfurization. At the end of this period, the shaped catalyst was 15° F. (8.3° C.) more active than the cylindrical catalyst when producing a desulfurized product containing 0.37 weight percent sulfur. The liquid space velocity was then increased to 3.99, effecting a fourfold increase in mass velocity. The temperature in each reactor was then adjusted to produce a product containing 0.65 weight percent sulfur. Under these conditions, the shaped catalyst was 22° F. (12.2° C.) more active than the cylindrical catalyst, whereas the expected activity difference was only 16° F. (9° C.). This demonstrates that in second stage operation the activity of the shaped promoted catalyst is improved to an unexpectedly great extent by an increase in mass velocity, as compared to a similar but non-promoted catalyst. In a reactor containing a bed of promoted catalyst, the recycle of liquid product advantageously both simulates second stage operation and increases the mass velocity.

EXAMPLE 3

Tests were conducted to illustrate the advantageous effect of shaped promoted catalyst particles as described above in a second stage residual oil hydrodesulfurization reactor, as compared to the operation of a similar second stage hydrodesulfurization reactor operated under similar conditions except that cylindrically shaped promoted catalyst particles as described above were utilized. The feed oil employed in each test was a topped 650° F.+ (343° C.+) residual oil containing 1.09 weight percent sulfur which was the effluent obtained from single stage hydrodesulfurization of a 650° F.+ (343° C.+) Kuwait ATB containing 3.8 weight percent sulfur with a non-promoted catalyst.

The tests were performed in individual reactors of equal diameter with the feed oil being passed downwardly in trickle flow over the catalyst. In each test, the LHSV was 1.0 volume of oil per hour per volume of catalyst, the hydrogen pressure was 2,100 psi (147 kg/cm$^2$) and the hydrogen rate was 4,000 SCF/B (72 SCM/100L). The temperature was gradually increased with catalyst age in each test to produce a liquid product containing 0.32 weight percent sulfur.

Figure 2:
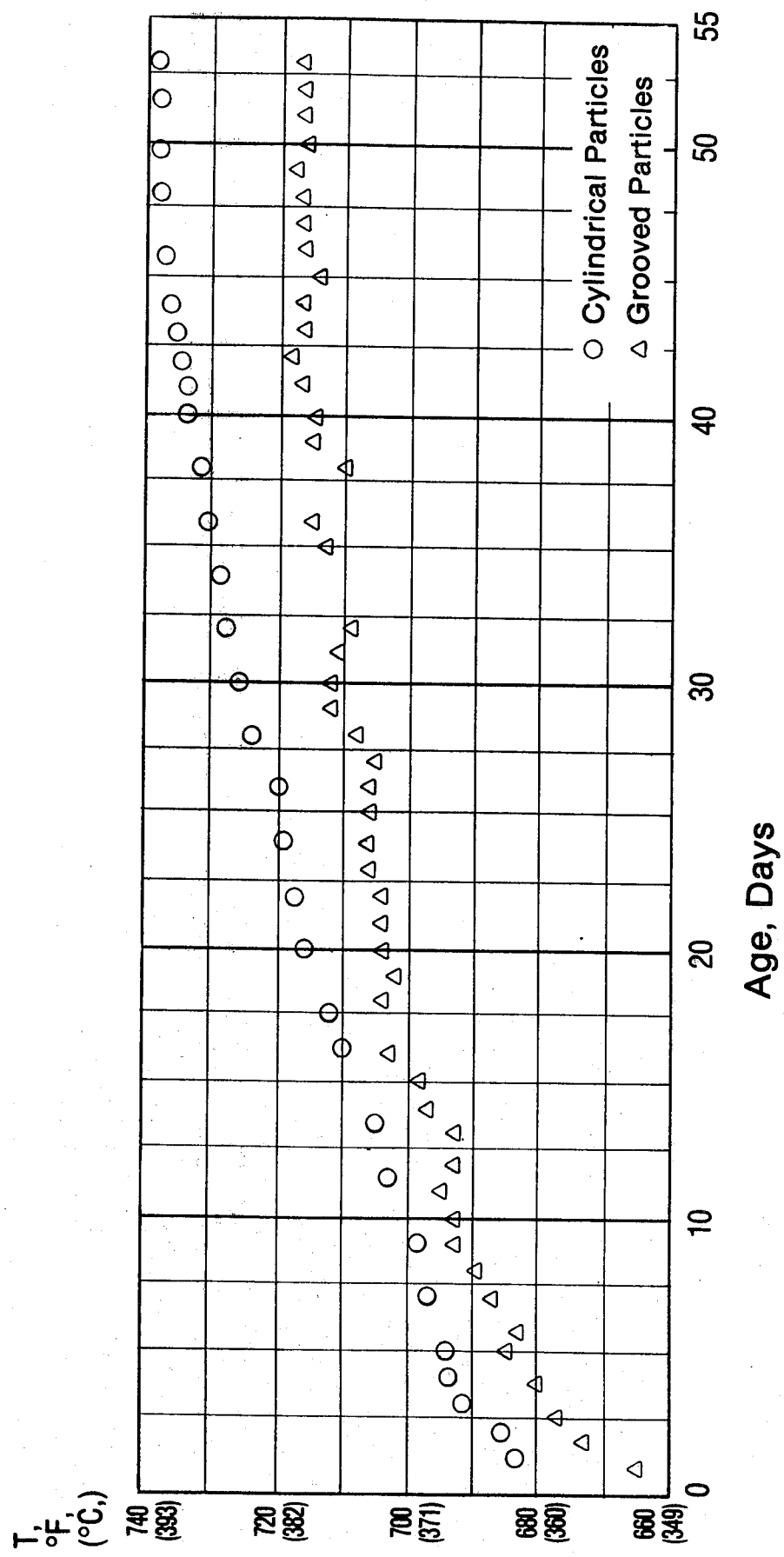

FIG. 2 shows the temperature requirements in each reactor over the test period. FIG. 2 shows that throughout the test period the temperature requirement in the reactor containing the shaped catalyst was lower than the temperature requirement in the reactor containing the cylindrical catalyst, indicating higher catalytic activity for the shaped catalyst. Moreover, FIG. 2 surprisingly shows that the relative temperature advantage in favor of the shaped catalyst increases with increasing catalyst age. For example, the relative temperature advantage for the shaped catalyst was 10° F. (5.5° C.) at a catalyst age of 5 days and increased somewhat to 12° F. (6.6° C.) at a catalyst age of 20 days. The temperature advantage increased slightly to 13° F. (7.2° C.) at 30 days. However, at 40 days the temperature advantage increased drastically to 19° F. (10.5° C.). Finally, at 53 days the temperature advantage in favor of the shaped catalyst widened to 21° F. (11.7° C.). At 53 days the temperature curve for the shaped catalyst appears essentially flat. In fact, FIG. 2 shows that the temperature curve for the shaped catalyst started to flatten at between 9 and 20 days and maintained a relatively plateau-like configuration after 20 days, whereas the temperature curve for the cylindrical catalyst failed to achieve a plateau during this period. Since, as indicated above, aging of the second stage catalyst is almost entirely due to coke formation, the flattening of the temperature curve for the shaped catalyst indicates that the coke on the shaped catalyst has reached an equilibrium level, i.e. old coke is being removed from the catalyst as rapidly as new coke is being deposited. At the indicated stage of catalyst age, this situation has not been achieved for the cylindrical catalyst.

In contrast to the widening temperature advantage for the shaped promoted catalyst in second stage operation relative to a cylindrical promoted catalyst, as shown in FIG. 2, FIG. 1 fails to show a comparable widening temperature advantage in a first stage residual oil hydrodesulfurization operation employing non-promoted shaped and cylindrical catalysts, nor does it show a comparable plateau-like aging curve for the shaped non-promoted catalyst. Therefore, it is apparent that the advantage illustrated in FIG. 2 for the shaped catalyst is specific to second stage operation employing a catalyst promoted with a Group IV-B metal. Since recycle of liquid product simulates second stage operation, this example illustrates the advantage of utilizing a downstream bed of promoted catalyst in a hydrodesulfurization reactor with product recycle.

EXAMPLE 4

A test was conducted to illustrate the exceptionally high activity of the shaped catalyst particles described above. In performing these tests, a fresh sample of shaped non-promoted catalyst particles as described above was crushed to destroy the particle shape and produce generally spherical particles between 20 and 35 mesh in size (0.0165 to 0.0331 inch) (0.0419 to 0.0841 cm). Crushing increased the surface area to volume ratio from 140 1/inch to about 240 1/inch (53 1/cm to 94 1/cm). The hydrodesulfurization activity of the crushed shaped particles was tested for comparison with the hydrodesulfurization activity of the uncrushed shaped particles. For comparative purposes, a fresh sample of non-promoted cylindrical extrudates as described above whose surface area to volume ratio was 145 1/inch (57 1/cm) was crushed to form generally spherical particles between 20 and 35 mesh in size (0.0165 to 0.0331 inch) (0.0419 to 0.0841 cm), having a surface area to volume ratio of about 240 1/cm (94 1/cm). The hydrodesulfurization activity of the crushed cylindrical extrudates was tested for comparison with the hydrodesulfurization activity of the uncrushed cylindrical extrudates. All the hydrodesulfurization tests were performed with a 650° F. (343° C.) Kuwait ATB containing 3.80 weight percent sulfur in first stage downward trickle flow operation at an LHSV of 0.88 volumes of liquid per hour per volume of catalyst to reduce the sulfur content of the oil to a constant sulfur content of 0.95 weight percent. The following table shows the temperatures required to maintain this product sulfur level at various catalyst ages.

| | TEMPERATURE ° C. | | | |
|---|---|---|---|---|
| Age, days | Uncrushed shaped particles | Crushed shaped particles | Uncrushed cylindrical particles | Crushed cylindrical particles |
| 0.5 | — | 363 | — | 366 |
| 1.5 | — | 367 | — | 370 |
| 2.0 | 370.5 | — | 387 | — |
| 2.5 | — | 372 | — | 372 |
| 3.5 | — | 372 | — | 372 |
| 4.0 | — | — | 388 | — |
| 4.5 | 375 | 375 | — | 374 |

The above table shows that the uncrushed cylindrical particles required a temperature about 13° to 16.5° C. higher than was required by the uncrushed shaped particles. This temperature advantage is also illustrated in the aging curve of FIG. 1. While the temperature requirement for the cylindrical particles was reduced considerably by crushing, the table shows that crushing of the shaped particles did not affect the temperature requirement, even though the surface area to volume ratio was increased by crushing. This indicates that the shaped particles, unlike the cylindrical particles, had already achieved an optimum activity based upon particle size. This observation is highly surprising because it has been generally assumed that particle size reduction would automatically increase the activity of a catalyst particle due to an increase in the surface area to volume ratio.

Figure 3:
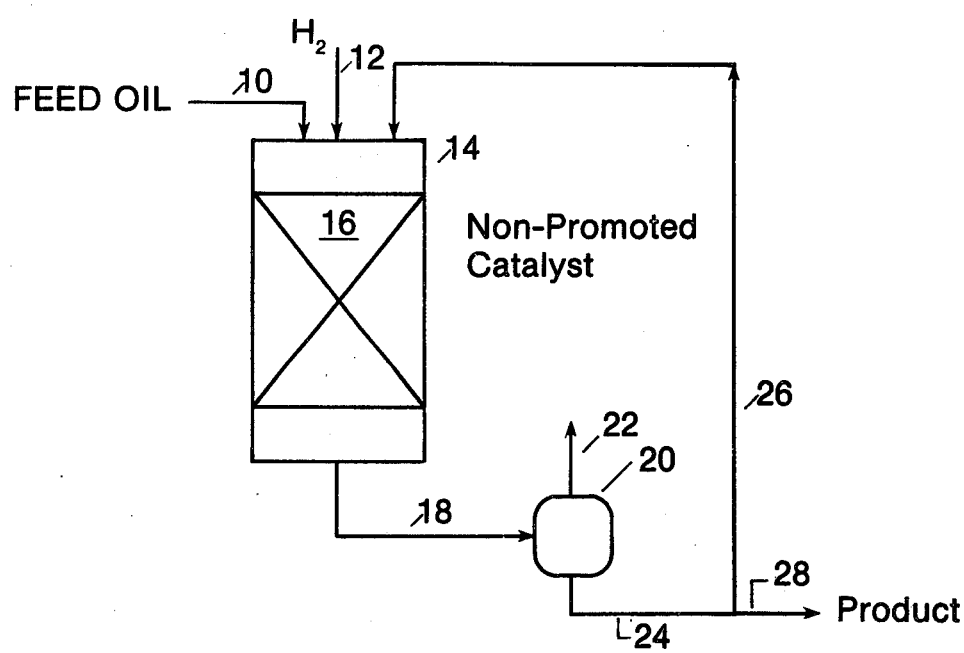

FIG. 3 shows an embodiment of this invention employing only non-promoted catalyst. As shown in FIG. 3, feed oil is charged through line 10 while purified recycle hydrogen is charged through line 12 to the top of reactor 14 containing a stationary bed of non-promoted catalyst 16 which is in the form of the shaped particles of this invention. Reactor effluent in line 18 is passed to flash chamber 20 from which hydrogen contaminated with hydrogen sulfide and ammonia is removed through line 22 for purification and recycle, and from which liquid is removed through line 24. A portion of the liquid in line 24, up to 50 percent of the total stream, is recycled to the top of reactor 14 through line 26 to increase the mass velocity in the reactor, while the remainder of the liquid in line 24 is removed as product through line 28.

Figure 4:
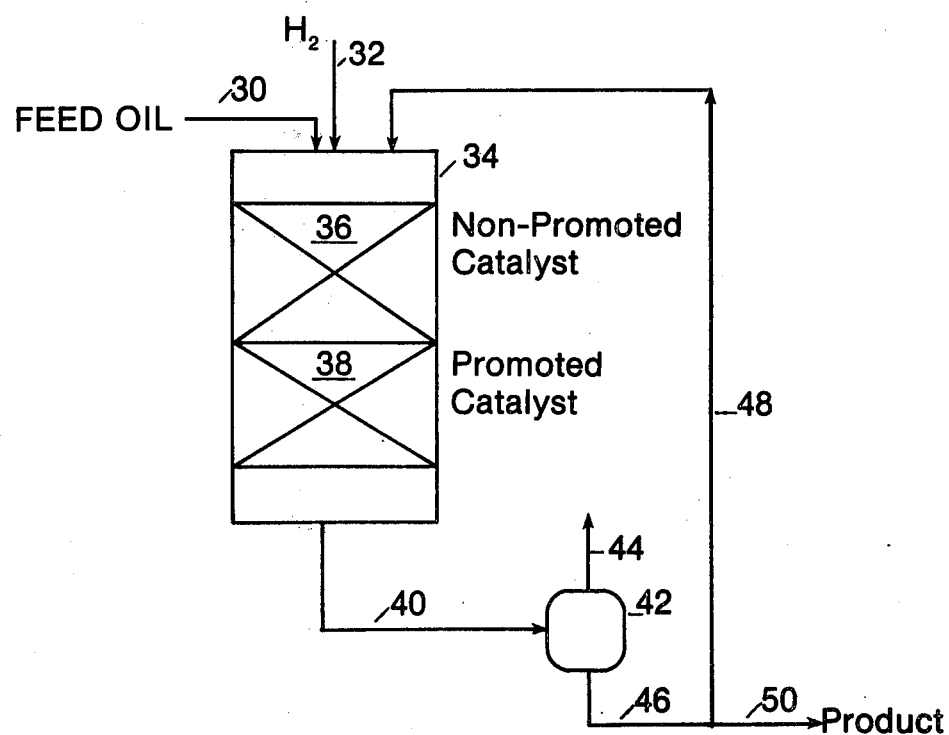

FIG. 4 shows the preferred embodiment of this invention in which separate beds or layers of non-promoted and promoted catalyst are used in series in one reactor. As shown in FIG. 4, feed oil is charged through line 30 and recycle hydrogen is charged through line 32 to the top of reactor 34. Reactor 34 contains a fixed bed of catalyst in two layers, including a top layer 36 of non-promoted catalyst and a bottom layer 38 of promoted catalyst, both in the form of the shaped particles of this invention. Reactor effluent in line 40 is passed to flash chamber 42 from which contaminated hydrogen is removed through line 44 for purification and recycle, and from which liquid is removed through line 46. A portion of the liquid in line 46 is recycled through line 48 to the top of reactor 34 to increase the mass velocity in reactor 34, while the remainder of the liquid is removed as product through line 50. Non-promoted catalyst bed 36 is particularly adapted for desulfurization of the fresh feed oil entering through line 30, while promoted catalyst bed 38 is particularly adapted for removal of the refractory sulfur in the recycle oil of the stream in line 48. Recycle stream 48 also advantageously tends to increase the liquid mass velocity through catalyst beds 36 and 38.

We claim:

1. In a process of the hydrodesulfurization of an asphaltene-containing oil containing sulfur and metals at a hydrogen pressure between 1,000 and 5,000 psi and a temperature between 600° and 900° F. wherein said oil and hydrogen are passed downwardly in trickle flow through a reactor containing a bed of catalyst particles comprising Group VI and Group VIII metals on a non-cracking support and desulfurized liquid is removed from said reactor, the invention comprising the particles of said catalyst comprising elongated extrudates which show in cross-section at least one groove defining protrusions and an average concavity index between about 1.01 and 1.35, the shortest distance between the depth of said at least one groove and the center in said cross-section being between about 1/30 and 1/120 inch, and increasing the liquid mass velocity in said reactor by recycling a portion of said liquid product to said reactor to accomplish a given amount of desulfurization at a lower temperature than would be required without said product recycle.

2. The process of claim 1 wherein the particles of said catalyst are provided with a plurality of grooves defining more than two protrusions.

3. The process of claim 1 wherein said shortest distance is between 1/40 and 1/110 inch.

4. The process of claim 1 wherein said shortest distance is between 1/50 and 1/100 inch.

5. The process of claim 1 wherein a portion of the full range liquid product is recycled.

6. The process of claim 1 wherein a gas oil fraction of the liquid product is recycled.

7. The process of claim 1 wherein a residual fraction of the liquid product is recycled.

8. The process of claim 1 wherein the catalyst particles have between 2 and 8 longitudinal grooves.

9. The process of claim 1 wherein the catalyst particles have an average concavity index between 1.05 and 1.25.

10. The process of claim 1 wherein the catalyst particles have a concavity index between 1.10 and 1.20.

11. In a process for the hydrodesulfurization of an asphaltene-containing oil containing sulfur and metals at a hydrogen pressure between 1,000 and 5,000 psi and a temperature between 600° and 900° F. wherein said oil and hydrogen are passed downwardly in trickle flow through a reactor containing upstream and downstream beds of catalyst particles in series, wherein said catalyst particles in said downstream bed comprising Group VI and Group VIII metals together with a promoting amount comprising between 1 and 10 weight percent based on total catalyst weight of Group IV-B metal on a non-cracking support and wherein the catalyst particles in said upstream bed comprising Group VI and Group VIII metals on a non-cracking support without said promoting amount of Group IV-B metal, and desulfurized liquid product is removed from said reactor, the invention comprising the particles of said catalyst in said upstream and downstream beds comprising elongated extrudates which show in cross-section at least one groove defining protrusions and an average concavity index between about 1.01 and 1.35, the shortest distance between the depth of said at least one groove and the center in said cross-section being between 1/30 and 1/120 inch, and increasing the liquid mass velocity in said reactor by recycling a portion of said liquid product to said reactor to accomplish a given amount of desulfurization at a lower temperature than would be required without said product recycle.

12. The process of claim 11 wherein the catalyst particles in said beds are provided with a plurality of grooves defining more than two protrusions.

13. The process of claim 11 wherein said shortest distance is between 1/40 and 1/110 inch.

14. The process of claim 11 wherein said shortest distance is between 1/50 and 1/100 inch.

15. The process of claim 11 wherein a portion of the full range liquid product is recycled.

16. The process of claim 11 wherein a gas oil fraction of the liquid product is recycled.

17. The process of claim 11 wherein a residual fraction of the liquid product is recycled.

18. The process of claim 11 wherein the catalyst particles in said upstream and downstream beds have been 2 and 8 longitudinal grooves.

19. The process of claim 11 wherein the catalyst particles in said upstream and downstream beds have an average concavity index between 1.05 and 1.25.

20. The process of claim 11 wherein the catalyst particles in said upstream and downstream beds have an average concavity index between 1.10 and 1.20.

21. The process of claim 11 wherein said Group IV-B metal is titanium.

* * * * *